United States Patent
Mori

(10) Patent No.: US 9,443,554 B2
(45) Date of Patent: Sep. 13, 2016

(54) IMAGE PROCESSING APPARATUS AND METHOD OF CONTROLLING THE SAME

(71) Applicant: CANON KABUSHIKI KAISHA, Tokyo (JP)

(72) Inventor: Tomokazu Mori, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/465,359

(22) Filed: Aug. 21, 2014

(65) Prior Publication Data

US 2014/0363136 A1 Dec. 11, 2014

Related U.S. Application Data

(62) Division of application No. 13/088,788, filed on Apr. 18, 2011, now Pat. No. 8,848,067.

(30) Foreign Application Priority Data

Apr. 23, 2010 (JP) ................................ 2010-100361

(51) Int. Cl.
| | | |
|---|---|---|
| H04N 5/225 | (2006.01) |
| H04N 9/80 | (2006.01) |
| H04N 5/93 | (2006.01) |
| G11B 27/031 | (2006.01) |
| G11B 27/034 | (2006.01) |
| G11B 27/32 | (2006.01) |
| H04N 5/77 | (2006.01) |
| H04N 9/82 | (2006.01) |
| H04N 21/433 | (2011.01) |
| H04N 21/81 | (2011.01) |
| H04N 1/32 | (2006.01) |

(52) U.S. Cl.
CPC .......... *G11B 27/031* (2013.01); *G11B 27/034* (2013.01); *G11B 27/32* (2013.01); *H04N 5/772* (2013.01); *H04N 9/8205* (2013.01); *H04N 21/4334* (2013.01); *H04N 21/8133* (2013.01); *H04N 21/8153* (2013.01); *H04N 1/32128* (2013.01); *H04N 2201/3242* (2013.01)

(58) Field of Classification Search
None
See application file for complete search history.

(56) References Cited

U.S. PATENT DOCUMENTS

2007/0052819 A1* 3/2007 Nakao ................ H04N 1/00204
348/231.1
2009/0060447 A1* 3/2009 Nakao .................... H04N 5/232
386/354

* cited by examiner

*Primary Examiner* — Mark Monk
(74) *Attorney, Agent, or Firm* — Cowan, Liebowitz & Latman, P.C.

(57) ABSTRACT

The present invention provides an image processing apparatus which records, on a recording medium, development parameters corresponding to a plurality of first Raw image frames, of a plurality of Raw image frames, which satisfy a predetermined condition, and a development parameter corresponding to a last Raw image frame, of the plurality of Raw image frames, which corresponds to a last image frame of a Raw moving image data, together with the Raw moving image data.

28 Claims, 12 Drawing Sheets

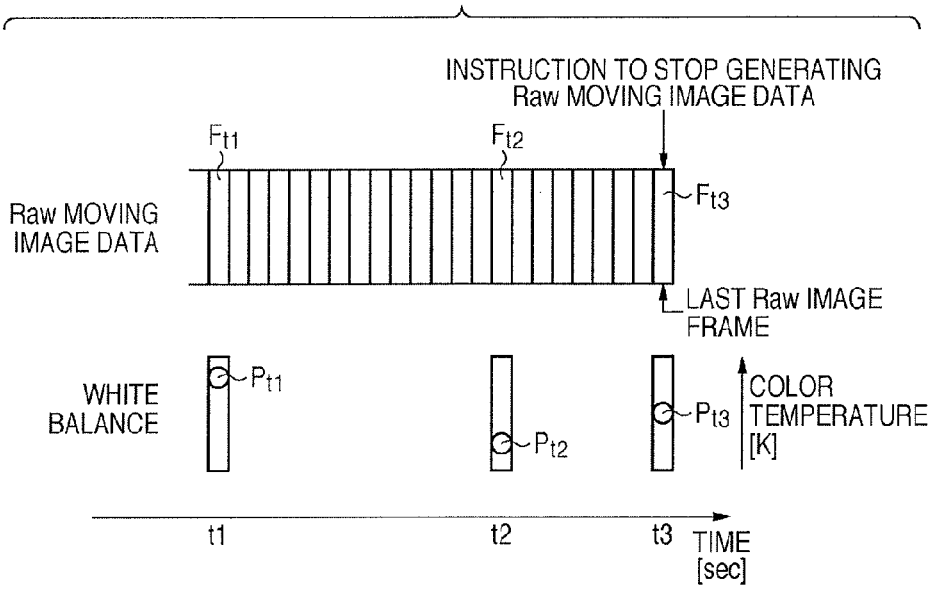
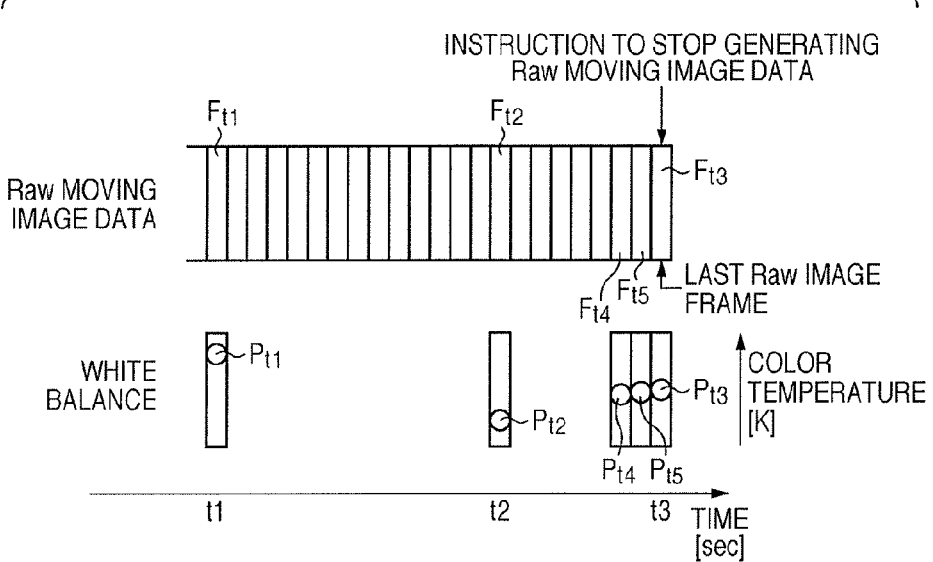

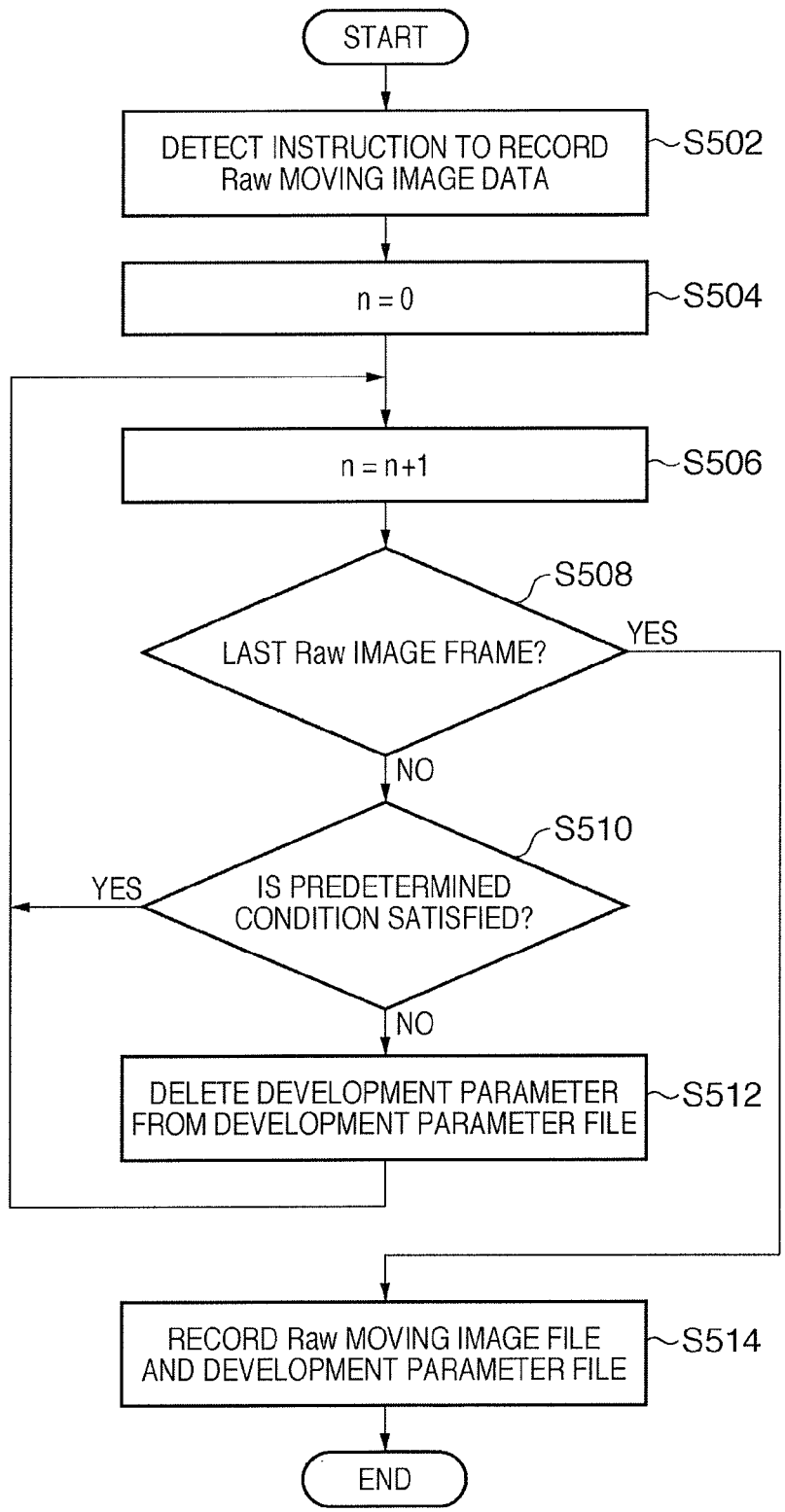

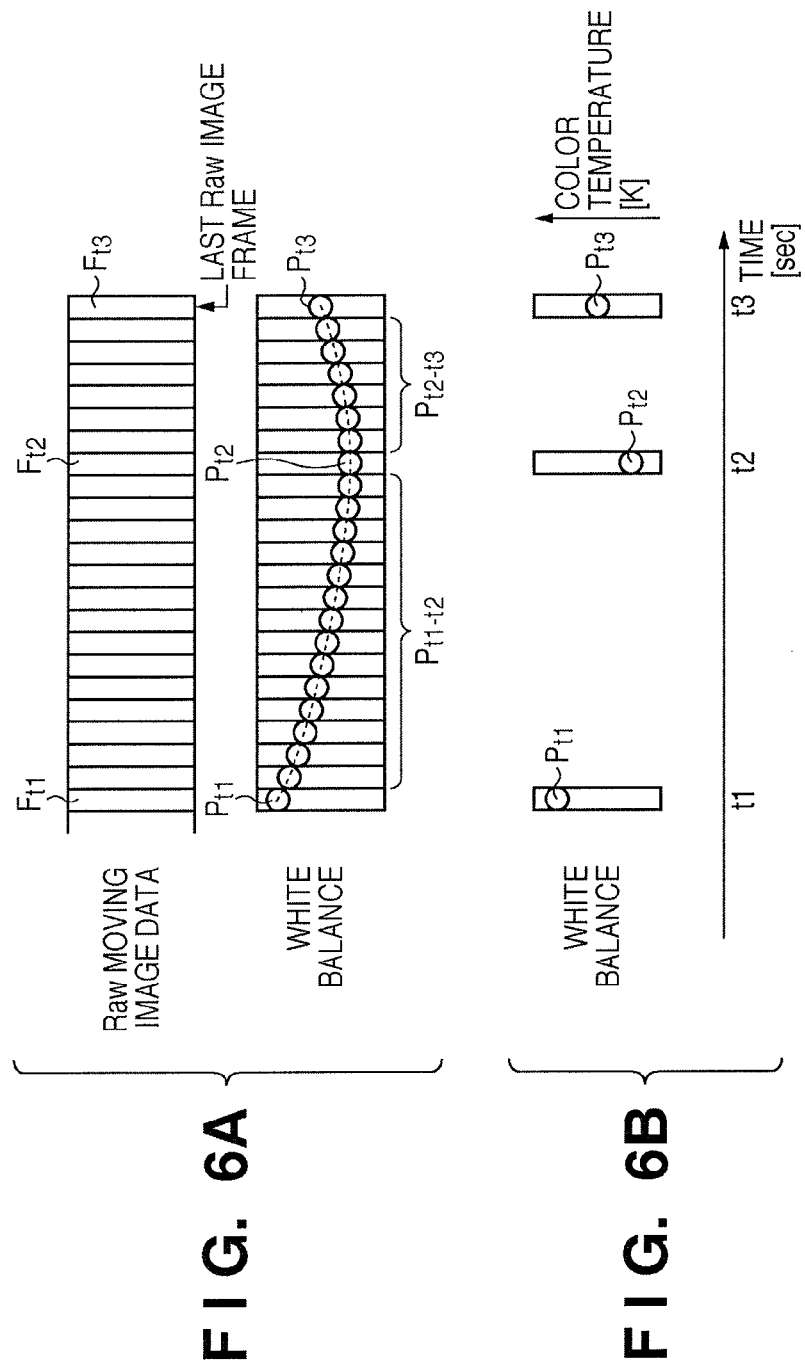

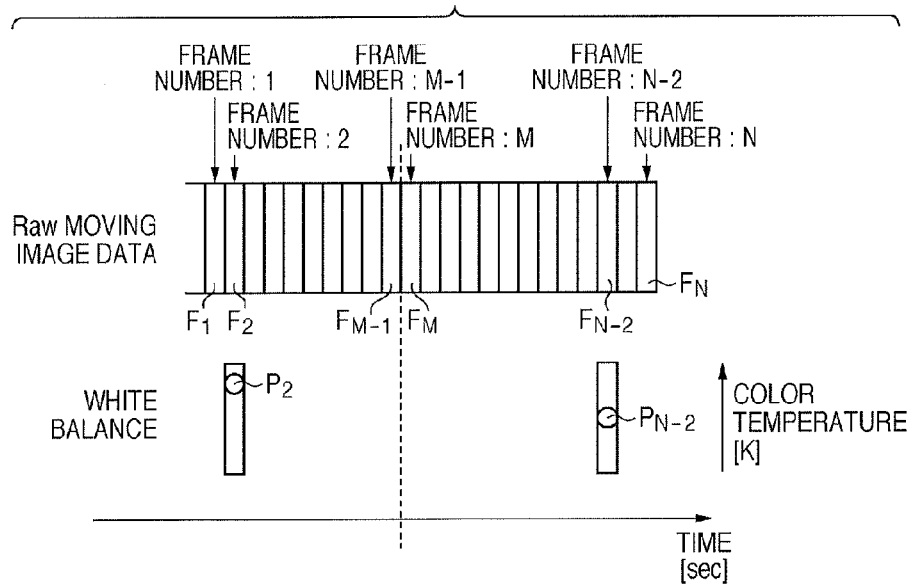
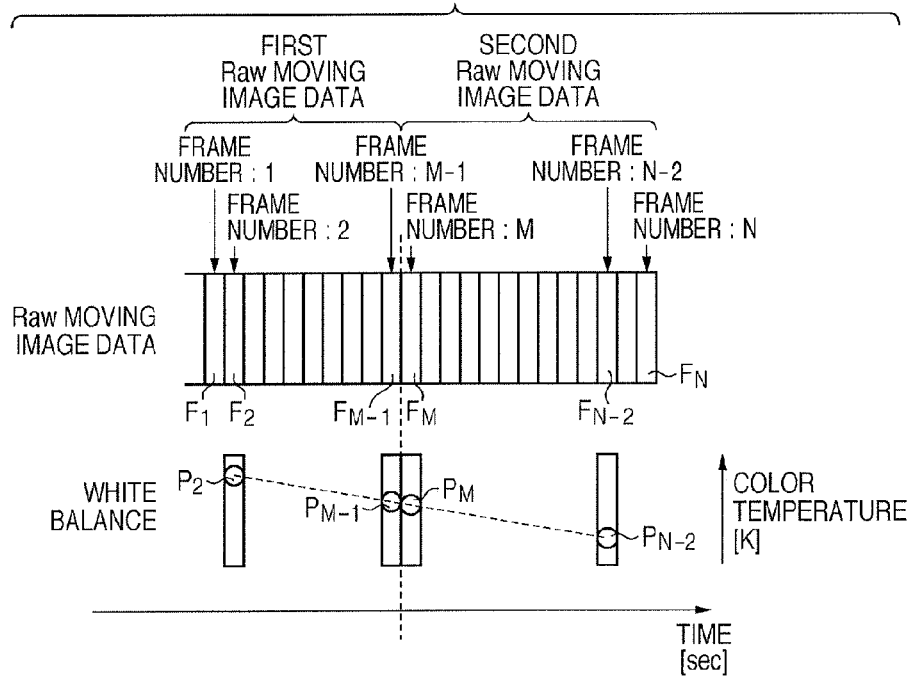

IMAGE PROCESSING APPARATUS AND METHOD OF CONTROLLING THE SAME

CROSS-REFERENCE TO RELATED APPLICATIONS

This application is a divisional of application Ser. No. 13/088,788, filed Apr. 18, 2011, the entire disclosure of which is hereby incorporated by reference.

BACKGROUND OF THE INVENTION

1. Field of the Invention

The present invention relates to an image processing apparatus and a method of controlling the apparatus.

2. Description of the Related Art

Editing still images uses Raw development processing which can obtain images corresponding to development parameters when the user designates various development parameters for image data in Raw format obtained by recording the image signals generated by an image capturing device. Note that development parameters are pieces of information necessary to adjust an image (its image quality), for example, the contrast, exposure correction, white balance, and hue.

In addition, recently, with the popularization of digital video cameras and improvement in the performance of personal computers, it has become a general practice to edit also moving images. Under the circumstances, image data in Raw format have been handled for moving images as well as still images. That is, it is thought that digital video cameras capable of recording files in Raw format will be in widespread use.

Unlike still image data, moving image data includes the image data of many frames (image frames). In order to properly express moving image data in Raw format (Raw moving image data), it is necessary to record (add) development parameters in all the Raw image frames constituting the Raw moving image data in advance. However, in one moving image content, development parameters hardly change greatly on a frame basis especially in the same scene, and hence it is not efficient to record development parameters for all the Raw image frames constituting the moving image content.

For this reason, Japanese Patent Laid-Open No. 2009-55335 has proposed a technique of recording development parameters for only Raw image frames at predetermined intervals when recording Raw moving image data. The technique disclosed in Japanese Patent Laid-Open No. 2009-55335 generates development parameters for Raw image frames, for which no development parameters have been recorded, by performing interpolation processing using the development parameters of Raw image frames at predetermined intervals when reproducing (developing) Raw moving image data.

FIG. 12 is a view showing Raw moving image data to be recorded in the prior art, in which Raw image frames constituting Raw moving image data and development parameters (color temperatures) are arranged along the time axis. According to the prior art, as shown in FIG. 12, development parameters $P_1$ and $P_m$ are recorded for only Raw image frames $F_1$ and $F_m$, of a plurality of Raw image frames, which appear at predetermined intervals.

When reproducing such Raw moving image data, it is possible to generate proper development parameters for Raw image frames in a zone $Z_1$ between the Raw image frame $F_1$ and the Raw image frame $F_m$ by performing interpolation processing using the development parameters $P_1$ and $P_m$.

However, for Raw image frames in a zone $Z_2$ between the Raw image frame $F_m$ and a last Raw image frame $F_f$, a development parameter necessary for interpolation processing (a development parameter for the last Raw image frame $F_f$) is not recorded. It is therefore impossible to generate proper development parameters for the development of the Raw image frames in the zone $Z_2$, and hence it is impossible to reproduce Raw moving image data with desired image quality.

SUMMARY OF THE INVENTION

The present invention provides a technique capable of recording Raw moving image data which allows to generate development parameters corresponding to a plurality of Raw image frames constituting the Raw moving image data.

According to one aspect of the present invention, there is provided an image processing apparatus for recording Raw moving image data constituted by a plurality of Raw image frames, the apparatus including a generating unit configured to generate a development parameter corresponding to a Raw image frame included in the Raw moving image data, a recording unit configured to record, on a recording medium, the Raw moving image data and the development parameter generated by the generating unit for the Raw image frame included in the Raw moving image data, and a control unit configured to control operation of the generating unit and operation of the recording unit, wherein the control unit is configured to control the generating unit and the recording unit to record, on the recording medium, development parameters corresponding to a plurality of Raw image frames which satisfy a predetermined condition, and a development parameter corresponding to a last Raw image frame of the plurality of Raw image frames which corresponds to a last image frame of the Raw moving image data, together with the Raw moving image data.

Further aspects of the present invention will become apparent from the following description of exemplary embodiments with reference to the attached drawings.

BRIEF DESCRIPTION OF THE DRAWINGS

FIGS. 3A and 3B are views showing Raw moving image data recorded by the operation of the image capturing apparatus shown in FIG. 1 in the first embodiment.

FIG. 5 is a flowchart for explaining the operation of the image capturing apparatus shown in FIG. 1 in the second embodiment.

FIGS. 6A and 6B are views for explaining Raw moving image data recorded by the operation of the image capturing apparatus shown in FIG. 1 in the second embodiment.

FIGS. 11A and 11B are views for explaining Raw moving image data recorded by the operation of the image processing apparatus shown in FIG. 9.

DESCRIPTION OF THE EMBODIMENTS

Figure 1:
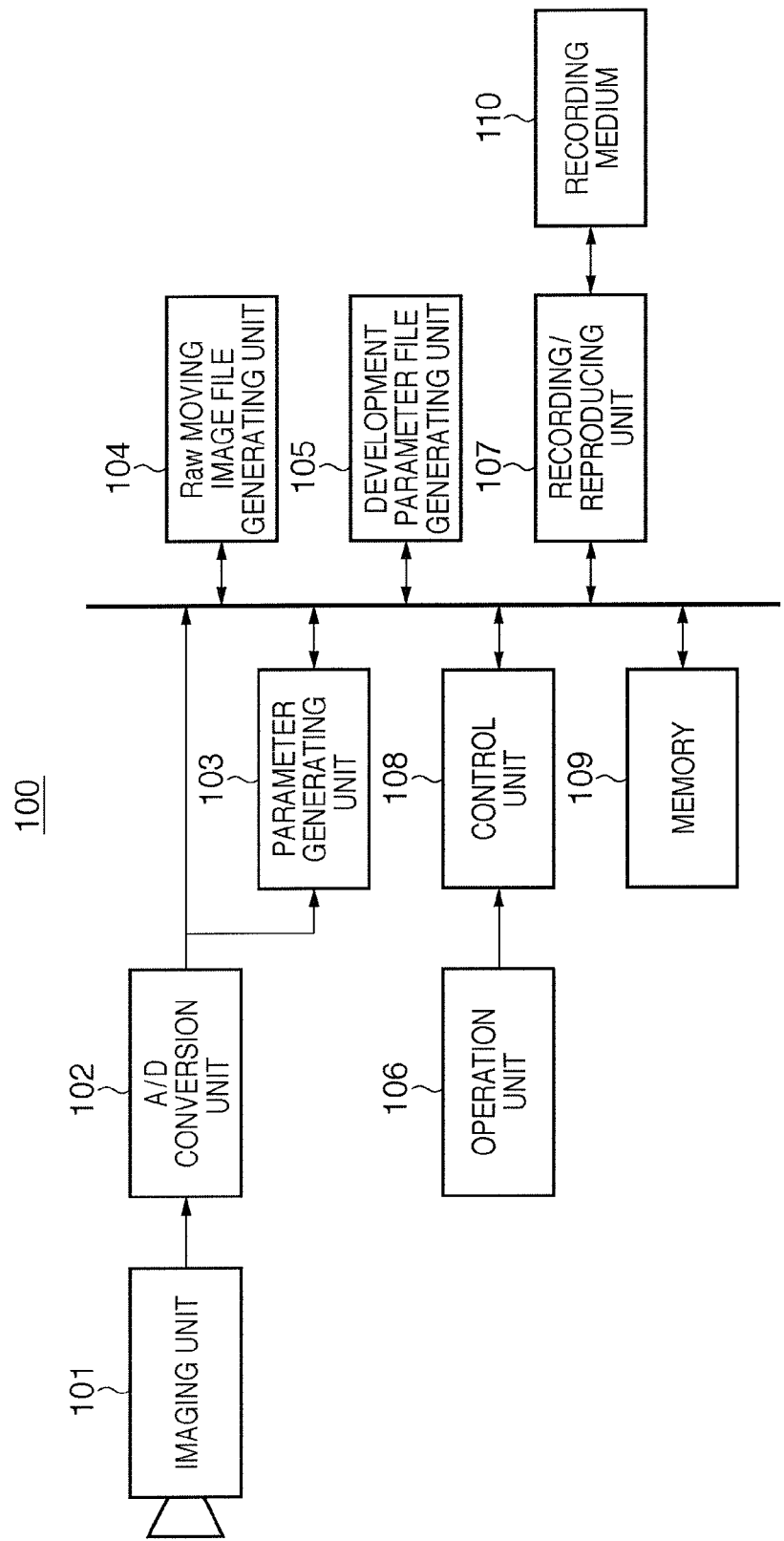
FIG. 1 is a schematic block diagram showing the arrangement of an image capturing apparatus functioning as an image processing apparatus as one aspect of the present invention.

Preferred embodiments of the present invention will be described below with reference to the accompanying drawings. Note that the same reference numerals denote the same members throughout the drawings, and a repetitive description thereof will not be given.

In this embodiment, moving image data recorded in Raw format will be referred to as Raw moving image data or a Raw moving image file. In addition, image frames constituting Raw moving image data or a Raw moving image file will be referred to as Raw image frames or Raw image data.

First Embodiment

FIG. 1 is a schematic block diagram showing the arrangement of an image capturing apparatus 100 functioning as an image processing apparatus as one aspect of the present invention. The image capturing apparatus 100 is an image capturing apparatus which selectively generates and records moving image data in Raw format (Raw moving image data) and still image data in Raw format (Raw still image data), and is embodied as a digital video camera in this embodiment. Note that Raw moving image data is image data constituted by a plurality of Raw image frames.

The imaging apparatus 100 includes an imaging unit 101, an A/D conversion unit 102, a parameter generating unit 103, a Raw moving image file generating unit 104, and a development parameter file generating unit 105. The image capturing apparatus 100 further includes an operation unit 106, a recording/reproducing unit 107, a control unit 108, a memory 109, and a recording medium 110.

The imaging unit 101 includes an imaging optical system including an imaging lens and a focus lens which can change its focal length, a stop mechanism which can change the aperture value, and an imaging device such as a CCD or a CMOS device (photoelectric conversion device). The imaging unit 101 converts light (incident light) from an object into an electrical signal. The A/D conversion unit 102 converts (digitally converts) electrical signals sequentially output from the imaging unit 101 on a frame basis into Raw image data.

The parameter generating unit 103 generates a development parameter, for each frame, which is required to reproduce (develop) Raw image data, based on the Raw image data output from the A/D conversion unit 102. In other words, the parameter generating unit 103 generates development parameters respectively corresponding to a plurality of Raw image frames constituting Raw moving image data. More specifically, development parameters include pieces of information for adjusting an image (its image quality) such as a contrast, white balance, color space, tone curve, and contour enhancement.

The Raw moving image file generating unit 104 generates a Raw moving image file based on the Raw image data output from the A/D conversion unit 102 on a frame basis. The Raw moving image file generated by the Raw moving image file generating unit 104 is recorded on the recording medium 110 via the recording/reproducing unit 107.

The development parameter file generating unit 105 generates a development parameter file based on the development parameters output from the parameter generating unit 103. Note that development parameters constituting the development parameter file generated by the development parameter file generating unit 105 are respectively associated with Raw image frames corresponding to the Raw image data output from the A/D conversion unit 102.

The operation unit 106 is constituted by various buttons for accepting user's operation (inputting an operation instruction) and the like. For example, the operation unit 106 includes an imaging start button and an imaging end button. The user can issue an instruction to generate Raw moving image data by operating the imaging start button, and can issue an instruction to stop generating Raw moving image data by operating the imaging end button.

The recording/reproducing unit 107 writes image data in the recording medium 110, and reads out image data recorded in the recording medium 110. In this embodiment, the recording/reproducing unit 107 has a function of recording Raw moving image data and development parameters corresponding to the Raw image frames constituting the Raw moving image data on the recording medium 110, as will be described later.

The control unit 108 includes a CPU and controls the overall operation of the imaging apparatus 100. The control unit 108 controls the respective units of the image capturing apparatus 100 to record, on the recording medium 110, development parameters corresponding to Raw image frames, of the plurality of Raw image frames constituting Raw moving image data, which satisfy a predetermined condition, together with the Raw moving image data. The control unit 108 also controls the respective units of the image capturing apparatus 100 to record, on the recording medium 110, development parameters corresponding to the last Raw image frame corresponding to the last image frame of the Raw moving image data, together with the Raw moving image data.

The memory 109 is formed by a semiconductor storage device such as an SDRAM (Synchronous Dynamic Random Access Memory), and temporarily stores data output from each unit of the image capturing apparatus 100.

The operation of the image capturing apparatus 100, more specifically, the operation of recording Raw moving image data constituted by a plurality of Raw image frames on the recording medium 110 will be described with reference to FIG. 2. The control unit 108 comprehensively controls the respective units of the image capturing apparatus 100 to execute this operation.

In step S202, the control unit 108 detects that the user has issued an instruction to generate Raw moving image data via the operation unit 106 (that is, has operated the imaging start button). This causes the image capturing apparatus 100 to start capturing a moving image.

In step S204, the control unit 108 initializes flags, variables, and the like associated with the capturing of a moving image. More specifically, the control unit 108 initializes a frame number n (n=0) in a series of processing repeatedly performed for each frame. The control unit 108 also initializes an imaging end flag end_flag for storing information indicating that the user has issued an instruction to stop generating Raw moving image data (that is, has operated the imaging end button) (end_flag=0).

In step S206, the control unit 108 increments the frame number n by +1 (n=n+1). For example, the frame number n is set to 1 for a frame from which the capturing of a moving image has started.

In step S208, the imaging unit 101 and the A/D conversion unit 102 generate Raw image data (Raw image frame) of the frame number n under the control of the control unit 108.

In step S210, the parameter generating unit 103 generates a development parameter based on the Raw image data of the frame number n generated in step S208 (that is, a development parameter for the Raw image frame of the frame number n) under the control of the control unit 108.

In step S212, the Raw moving image file generating unit 104 generates a Raw moving image file by recording (writing) the Raw image data of the frame number n generated in step S208 in a file under the control of the control unit 108. Note that in generating a Raw image file, it is possible to record Raw image data in a file for each frame, as shown in FIG. 2, or to buffer Raw image data in the memory 109 and record the data in a file at predetermined time intervals.

In step S214, the control unit 108 determines whether the user has issued an instruction to stop generating Raw moving image data via the operation unit 106 (that is, has operated the imaging end button). If the user has not issued any instruction to stop generating Raw moving image data, that is, the capturing of a moving image continues, the process shifts to step S216.

In step S216, the control unit 108 determines whether the Raw image data of the frame number n satisfies a predetermined condition, that is, the Raw image data of the frame number n is a Raw image frame (the first Raw image frame) which satisfies the predetermined condition. In this case, a Raw image frame which satisfies the predetermined condition is a Raw image frame extracted from a plurality of Raw image frames constituting Raw moving image data at predetermined frame intervals or a Raw image frame before or after the detection of a scene change (a Raw image frame corresponding to the scene change). It is possible to determine, as Raw image frames satisfying the predetermined condition, both a Raw image frame extracted from the plurality of Raw image frames constituting the Raw moving image data at predetermined frame intervals and a Raw image frame corresponding to the scene change. In addition, Raw image frames satisfying the predetermined condition may include, for example, a predetermined number of Raw image frames existing between the last Raw image frame and an immediately preceding one of the Raw image frames extracted at predetermined frame intervals. If the Raw image data of the frame number n does not satisfy the predetermined condition, the process shifts to step S206 without recording any development parameter. If the Raw image data of the frame number n satisfies the predetermined condition, the process shifts to step S218 to record the development parameter.

In step S218, the development parameter file generating unit 105 generates a development parameter file by recording (writing) the development parameter for the Raw image frame of the frame number n generated in step S210 in a file under the control of the control unit 108. Note that in generating a development parameter file, it is possible to record development parameters in a file for each frame, as shown in FIG. 2, or to buffer development parameters in the memory 109 and record them in a file at predetermined time intervals.

In step S220, the control unit 108 determines whether the imaging end flag end_flag is 1 (end_flag=1). If the imaging end flag end_flag is not 1, the process shifts to step S206. If the imaging end flag end_flag is 1, the process shifts to step S224.

This apparatus executes the processing in steps S206 to S220 on a frame basis while the capturing of a moving image continues (that is, until the user issues an instruction to stop generating Raw moving image data).

In step S214, if the control unit 108 determined that the user has issued an instruction to stop generating Raw moving image data, the process shifts to step S222. In step S222, the control unit 108 sets the imaging end flag end_flag to 1, and the process shifts to step S218. In this case, the control unit 108 causes the imaging unit 101 and the A/D conversion unit 102 to stop generating Raw moving image data. Note that if the user has issued an instruction to stop generating Raw moving image data, the Raw image frame of the frame number n becomes the Raw image frame generated last (last Raw image frame). In step S218, the development parameter file generating unit 105 generates a development parameter file by recording the development parameter for the Raw image frame of the frame number n as the last Raw image frame in a file.

In step S224, the recording/reproducing unit 107 records the Raw moving image file generated in step S212 and the development parameter file generated in step S218 on the recording medium 110 under the control of the control unit 108.

Figure 2:
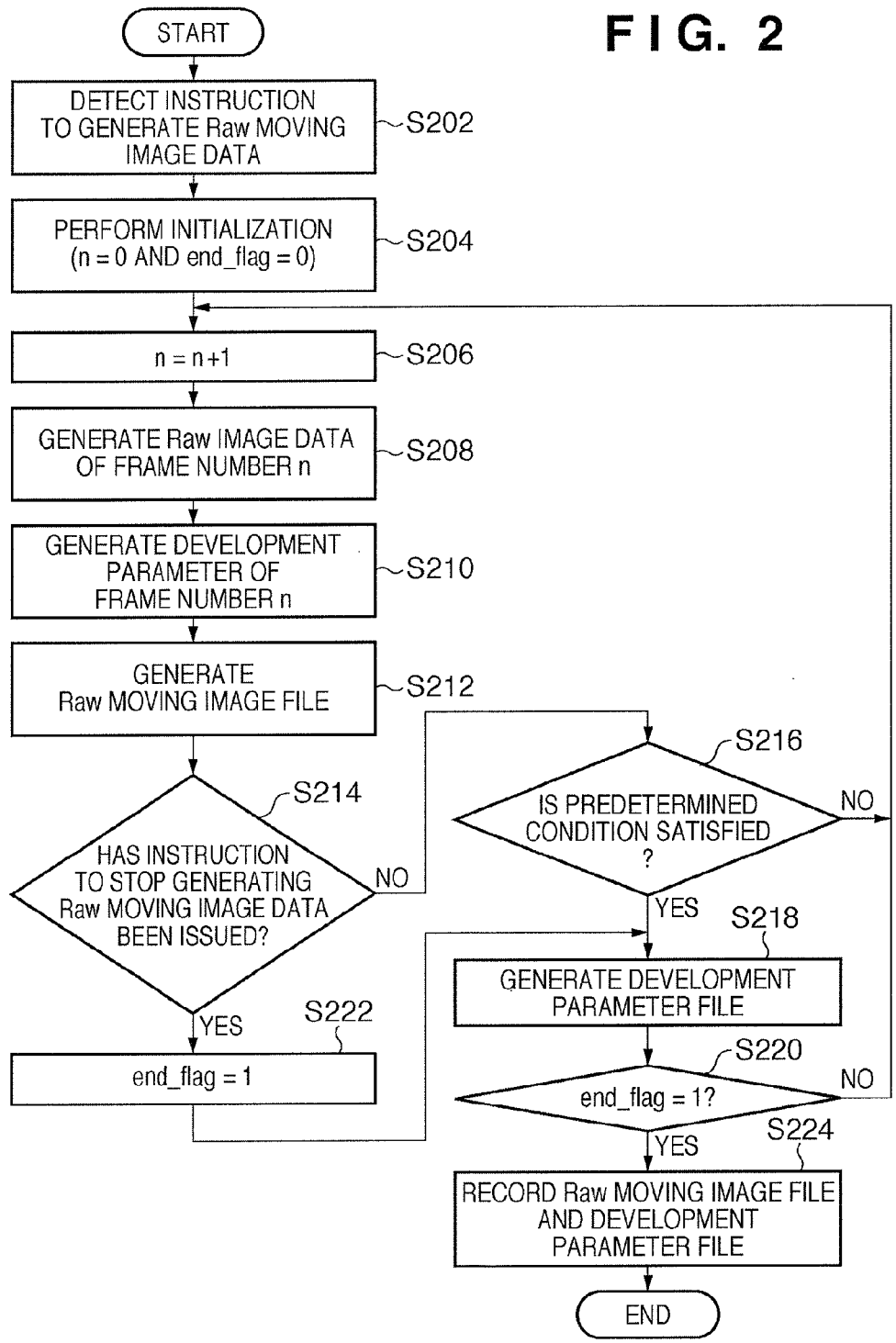
FIG. 2 is a flowchart for explaining the operation of the image capturing apparatus shown in FIG. 1 in the first embodiment.

FIGS. 3A and 3B are views showing Raw moving image data (that is, Raw moving image data generated by the operation shown in FIG. 2) to be recorded in the image capturing apparatus 100 of this embodiment. Referring to FIGS. 3A and 3B, Raw image frames constituting Raw moving image data and development parameters (white balances in this embodiment) are arranged along the time axis.

FIG. 3A shows a case in which Raw image frames satisfying a predetermined condition in step S216 are those which are extracted from a plurality of Raw image frames constituting Raw moving image data at predetermined frame intervals. Referring to FIG. 3A, a Raw image frame $F_{t1}$ at time t1 and a Raw image frame $F_{t2}$ at time t2 are determined as Raw image frames extracted predetermined frame intervals, and white balances $P_{t1}$ and $P_{t2}$ corresponding to the respective frames are recorded. Assume that the user has issued an instruction to stop generating Raw moving image data at time t3. In this case, a Raw image frame $F_{t3}$ generated at time t3 is determined as the last Raw image frame, and a white balance $P_{t3}$ corresponding to the Raw image frame $F_{t3}$ is recorded.

In addition, buffing development parameters in the memory 109 makes it possible to record development parameters for arbitrary Raw image frames as well as Raw image frames extracted at predetermined frame intervals, as shown in FIG. 3B. FIG. 3B shows a case in which two Raw image frames preceding the last Raw image frame are added as Raw image frames satisfying the predetermined condition. Referring to FIG. 3B, this apparatus records white balances $P_{t4}$ and $P_{t5}$ respectively corresponding to two Raw image frames $F_{t4}$ and $F_{t5}$ preceding the last Raw image frame $F_{t3}$ as well as the white balances $P_{t1}$ to $P_{t3}$.

Figure 4A:
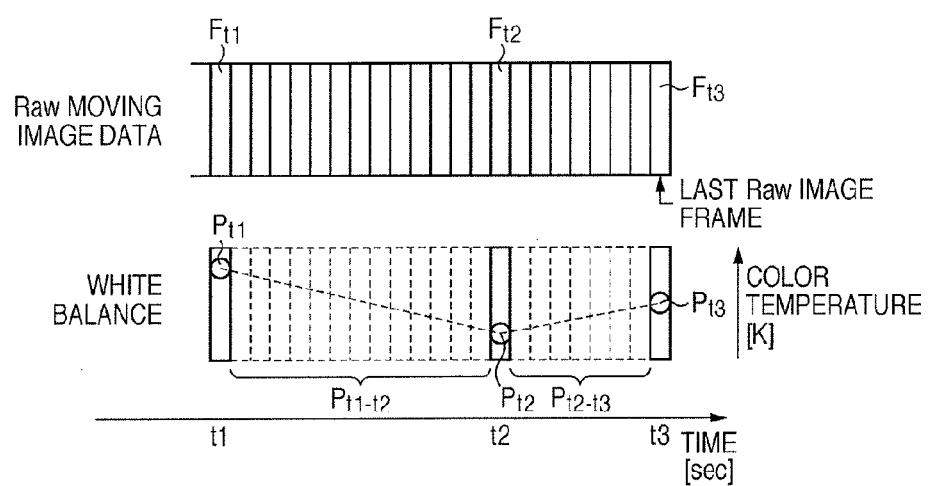
FIGS. 4A and 4B are views for explaining interpolation processing performed when reproducing (developing) the Raw moving image data shown in FIGS. 3A and 3B.
Figure 4B:
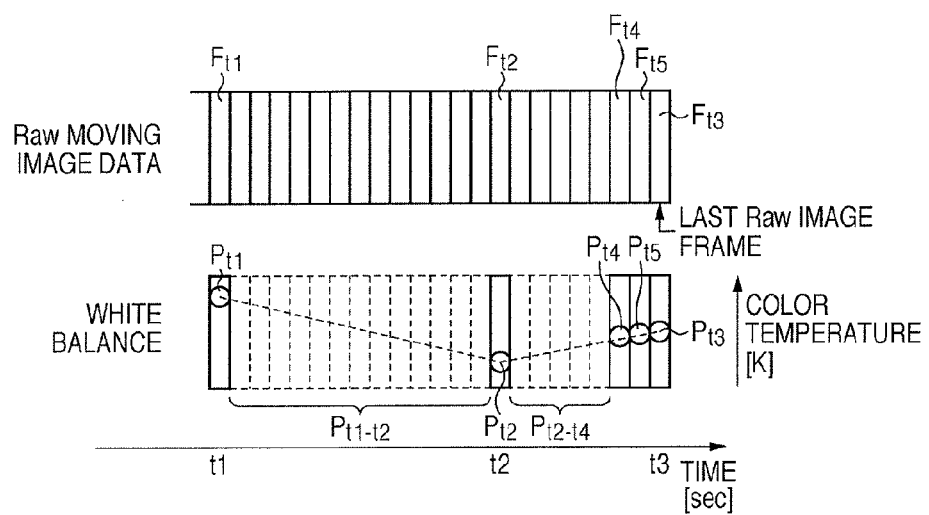

A case in which the recording/reproducing unit 107 reproduces (develops) Raw moving image data recorded in the image capturing apparatus 100 of this embodiment will be described with reference to FIGS. 4A and 4B. Note, however, that the user may insert a memory card or the like to which Raw moving image data and a development parameter file are copied into an external reproducing apparatus to reproduce (develop) the Raw moving image data. When reproducing Raw moving image data, it is necessary to generate proper development parameters for Raw image frames for which no development parameter has been recorded, by performing interpolation processing using development parameters recorded for the Raw moving image data. Note that FIG. 4A shows interpolation processing for the reproduction of the Raw moving image data shown in FIG. 3A. FIG. 4B shows interpolation processing for the reproduction of the Raw moving image data shown in FIG. 3B. Referring to FIGS. 4A and 4B, Raw image frames constituting Raw moving image data and development parameters (white balances in this embodiment) are arranged along the time axis.

Referring to FIG. 4A, the development parameters $P_{t1}$ and $R_{t2}$, indicated by the solid lines, respectively corresponding to the Raw image frames $F_{t1}$ and $F_{t2}$ are recorded in the Raw moving image data, as described above. In addition, development parameters $P_{t1-t2}$ and $P_{t2-t3}$ indicated by the broken lines, corresponding to Raw image frames are generated by interpolation processing. More specifically, the apparatus generates the proper development parameter $P_{t1-t2}$ for the Raw image frames existing between the Raw image frame $F_{t1}$ and the Raw image frame $F_{t2}$ by interpolation processing using the development parameters $P_{t1}$ and $P_{t2}$. The apparatus also generates the proper development parameter $P_{t2-t3}$ for the Raw image frames existing between the Raw image frame $F_{t2}$ and the Raw image frame $F_{t3}$ by interpolation processing using the development parameters $P_{t2}$ and $P_{t3}$.

Referring to FIG. 4B, the development parameters $P_{t1}$ to $P_{t5}$, indicated by the solid lines, respectively corresponding to the Raw image frames $F_{t1}$ to $F_{t5}$ are recorded in the Raw moving image data, as described above. In addition, the development parameter $P_{t1-t2}$ and a development parameter $P_{t2-t4}$, indicated by the broken lines, corresponding to Raw image frames are generated by interpolation processing. More specifically, the apparatus generates the proper development parameter $P_{t1-t2}$ for the Raw image frames existing between the Raw image frame $F_{t1}$ and the Raw image frame $F_{t2}$ by interpolation processing using the development parameters $P_{t1}$ and $P_{t2}$. The apparatus also generates the proper development parameter $P_{t2-t4}$ for the Raw image frames existing between the Raw image frame $F_{t2}$ and the Raw image frame $F_{t4}$ by interpolation processing using the development parameters $P_{t2}$, $P_{t3}$, $P_{t4}$, and $P_{t5}$.

As described above, according to this embodiment, it is possible to record development parameters corresponding to Raw image frames satisfying a predetermined condition and a development parameter corresponding to the last Raw image frame in association with Raw moving image data. When reproducing such Raw moving image data, therefore, it is possible to generate proper development parameters for Raw image frames in which no development parameter has been recorded, by interpolation processing, and reproduce the Raw moving image data with desired image quality.

Second Embodiment

The operation of the image capturing apparatus 100, more specifically, the operation of recording Raw moving image data constituted by a plurality of Raw image frames on a recording medium 110 will be described with reference to FIG. 5. A control unit 108 executes this operation by comprehensively controlling the respective units of the image capturing apparatus 100. Assume that in this embodiment, a Raw moving image file generating unit 104 has already generated a Raw image file recording Raw image frames constituting Raw moving image data. Assume also that a development parameter file generating unit 105 has already generated a development parameter file recording development parameters (white balances in this embodiment) respectively corresponding to the Raw image frames constituting the Raw moving image data.

In step S502, the control unit 108 detects that the user has issued an instruction to record Raw moving image data via an operation unit 106. This starts the recording of the Raw image file and the development parameter file on the recording medium 110.

In step S504, the control unit 108 initializes a frame number n (n=0) in a series of processing repeatedly performed for each frame. The frame number n corresponds to the recording order of a plurality of Raw image frames recorded in the Raw moving image file. In step S506, the control unit 108 increments the frame number n by +1 (n=n+1). For example, the frame number n is set to 1 for the Raw image frame recorded first in the Raw moving image file.

In step S508, the control unit 108 determines whether the Raw image frame of the frame number n is the last Raw image frame. If the Raw image frame of the frame number n is not the last Raw image frame, the process shifts to step S510.

In step S510, the control unit 108 determines whether the Raw image frame of the frame number n satisfies a predetermined condition. That is, the control unit 108 determines whether the Raw image frame of the frame number n is a Raw image frame satisfying the predetermined condition. Note that as in the first embodiment, Raw image frames satisfying the predetermined condition are, for example, Raw image frames extracted from a plurality of Raw image frames constituting Raw moving image data at predetermined frame intervals. If the Raw image data of the frame number n does not satisfy the predetermined condition, the process shifts to step S512.

In step S512, the development parameter file generating unit 105 deletes a development parameter corresponding to the Raw image frame of the frame number n from the development parameter file under the control of the control unit 108. The process then shifts to step S506.

In step S510, if the Raw image data of the frame number n satisfies the predetermined condition, the process shifts to step S506 without deleting a development parameter corresponding to the Raw image frame of the frame number n from the development parameter file.

The apparatus executes the processing in steps S506 to S512 for each frame until the Raw image frame of the frame number n reaches the last Raw image frame. When the Raw image frame of the frame number n reaches the last Raw image frame (that is, YES in step S508), the process shifts to step S514.

In step S514, a recording/reproducing unit 107 records the Raw moving image file and the development parameter file on the recording medium 110 under the control of the control unit 108. In this case, the recording/reproducing unit 107 records, on the recording medium 110, the development parameter file from which the development parameters corresponding the Raw image frames satisfying the predetermined condition and the developing parameters except the development parameter corresponding to the last Raw image frame are excluded.

FIGS. 6A and 6B are views for explaining Raw moving image data recorded in the image capturing apparatus 100 of this embodiment. Referring to FIGS. 6A and 6B, Raw image frames constituting Raw moving image data and development parameters (white balances in this embodiment) are arranged along the time axis.

FIG. 6A shows Raw moving image data before the operation shown in FIG. 5 (that is, development parameters respectively corresponding to Raw image frames constituting the Raw moving image data are recorded). FIG. 6B shows development parameters for the Raw moving image data generated by the operation shown in FIG. 5. Referring to FIG. 6B, the Raw image frames existing between a Raw image frame $F_{t1}$ and a Raw image frame $F_{t2}$ are neither Raw image frames extracted at predetermined frame intervals nor the last Raw image frame. A development parameter $P_{t1-t2}$ corresponding to the Raw image frames existing between the Raw image frame $F_{t1}$ and the Raw image frame $F_{t2}$ is deleted. Likewise, the Raw image frames existing between the Raw image frame $F_{t2}$ and a Raw image frame $F_{t3}$ are neither Raw image frames extracted at the predetermined frame intervals nor the last Raw image frame. Therefore, a development parameter $P_{t2-t3}$ corresponding to the Raw image frames existing between the Raw image frame $F_{t2}$ and the Raw image frame $F_{t3}$ is deleted.

As described above, in this embodiment, after development parameters corresponding to all the Raw image frames are recorded, development parameters are deleted except for development parameters corresponding to Raw image frames satisfying a predetermined condition and a development parameter corresponding to the last Raw image frame. As a consequence, it is possible to record the development parameters corresponding to Raw image frames satisfying the predetermined condition and the development parameter corresponding to the last Raw image frame in association with the Raw moving image data. When reproducing such Raw moving image data, therefore, it is possible to generate proper development parameters for Raw image frames in which no development parameter has been recorded, by interpolation processing, and reproduce the Raw moving image data with desired image quality.

Third Embodiment

The first embodiment has exemplified the case in which when the user issues an instruction to stop generating Raw moving image data, the apparatus immediately stops generating Raw moving image data. The third embodiment will exemplify a case in which even when the user issues an instruction to stop generating Raw moving image data, the apparatus continues generating Raw moving image data until a Raw image frame satisfying a predetermined condition is generated.

The operation of an image capturing apparatus 100, more specifically, the operation of recording Raw moving image data constituted by a plurality of Raw image frames on a recording medium 110 will be described with reference to FIG. 7. A control unit 108 executes this operation by comprehensively controlling the respective units of the image capturing apparatus 100.

The processing from step S702 to step S720 which shift in numerical order indicates the processing to be performed when the user has not issued an instruction to stop generating Raw moving image data (that is, the apparatus continues capturing a moving image). Note that since the processing in steps S702 to S720 is the same as that in steps S202 to S220, a detailed description of the processing will be omitted.

The following is the processing to be performed when the user issues an instruction to stop generating the moving image data of Raw moving image data (that is, the user issues an instruction to stop capturing a moving image).

When the user issues an instruction to stop generating Raw moving image data, the process shifts to step S722. In step S722, the control unit 108 sets an imaging end flag end_flag to 1, and the process shifts to step S716. In this case, the control unit 108 does not cause an imaging unit 101 and an A/D conversion unit 102 to stop generating Raw moving image data. In step S716, the control unit 108 determines whether the Raw image frame of a frame number n, that is, the Raw image frame generated when the user has issued the instruction to stop generating Raw moving image data, satisfies a predetermined condition.

If the Raw image frame generated when the user has issued the instruction to stop generating Raw moving image data satisfies the predetermined condition, the process shifts to step S718. In this case, the control unit 108 causes the imaging unit 101 and the A/D conversion unit 102 to stop generating Raw moving image data. In step S718, under the control of the control unit 108, a development parameter file generating unit 105 generates a development parameter file by recording (writing), in a file, a development parameter for the Raw image frame generated when the user has issued the instruction to stop generating Raw moving image data. Since the user has issued the instruction to stop generating Raw moving image data (imaging end flag end_flag=1), the process shifts to step S724 through step S720. In step S724, under the control of the control unit 108, the recording/reproducing unit 107 records the Raw moving image file generated in step S712 and the development parameter file generated in step S718 on the recording medium 110.

If the Raw image frame generated when the user has issued the instruction to stop generating Raw moving image data does not satisfy the predetermined condition, the process shifts to step S706 to repeat the above processing until a Raw image frame satisfying the predetermined condition is generated. When the Raw image frame satisfying the predetermined condition is generated, a development parameter file in which the Raw image frame and the development parameter are recorded (written) is generated in step S718. Since the user has issued the instruction to stop generating Raw moving image data (imaging end flag end_flag=1), the process shifts to step S724 through step S720. In step S724, under the control of the control unit 108, the recording/reproducing unit 107 records the Raw moving image file generated in step S712 and the development parameter file generated in step S718 on the recording medium 110.

Figure 7:
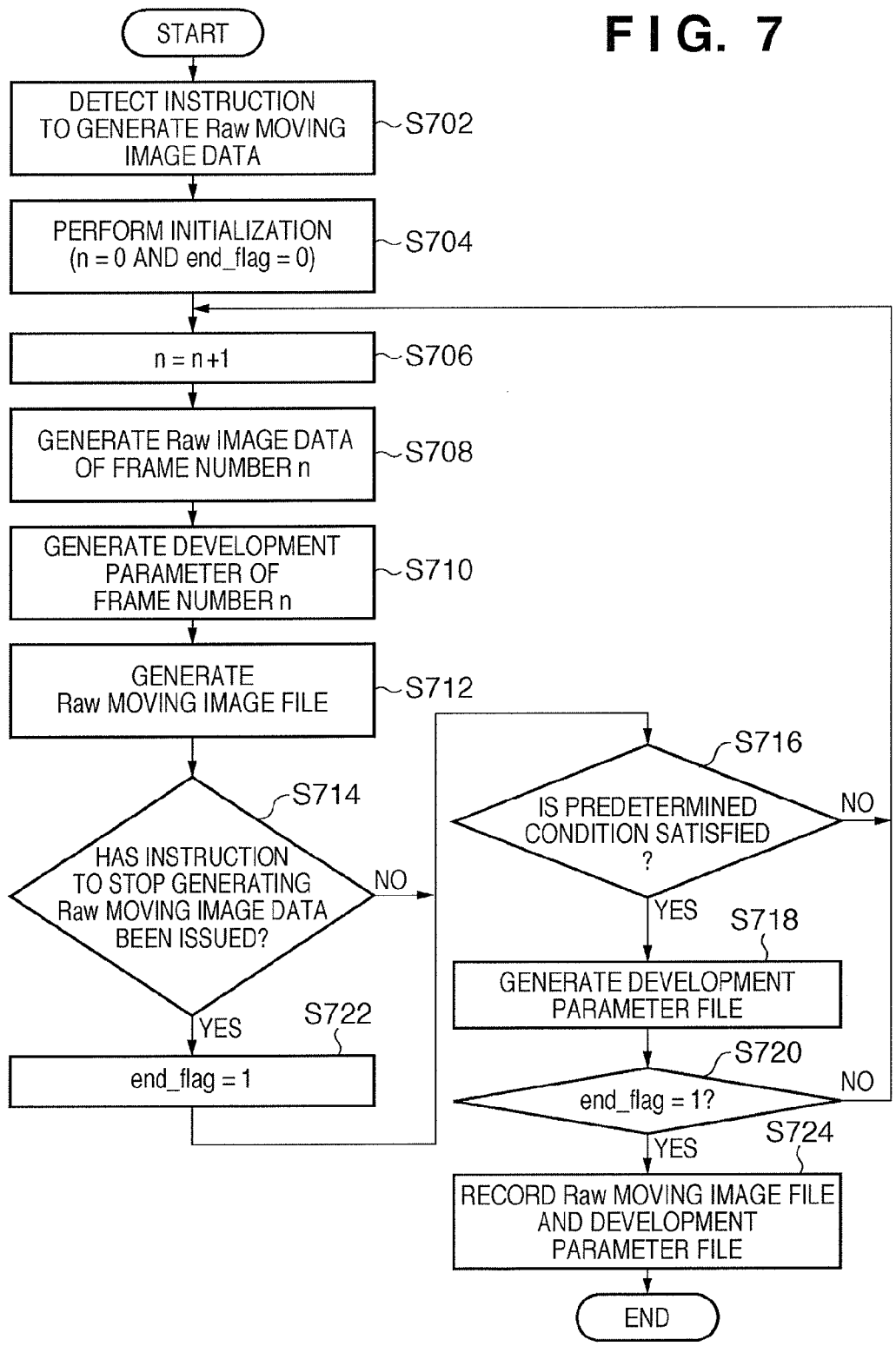
FIG. 7 is a flowchart for explaining the operation of the image capturing apparatus shown in FIG. 1 in the third embodiment.
Figure 8A:
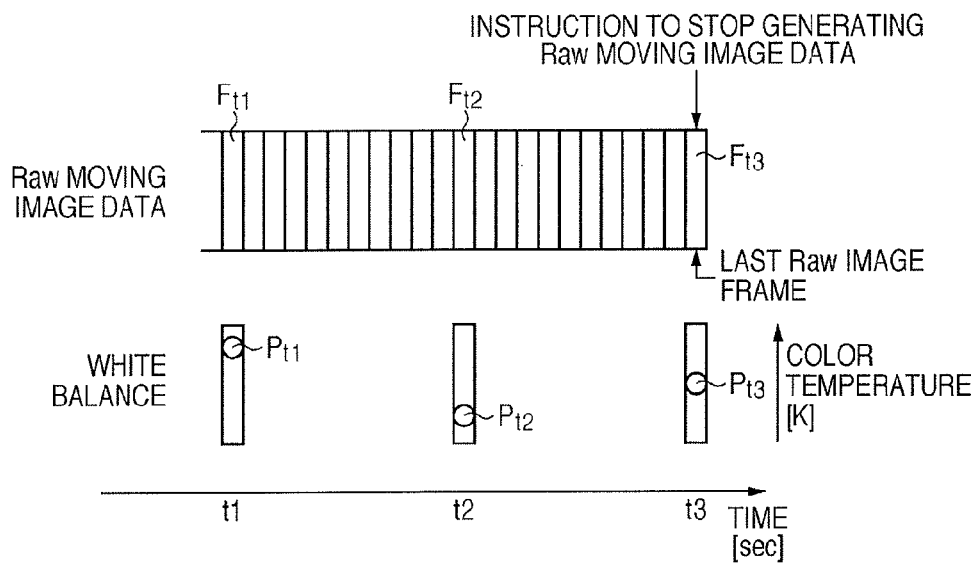
FIGS. 8A and 8B are views for explaining Raw moving image data recorded by the operation of the image capturing apparatus shown in FIG. 1 in the third embodiment.
Figure 8B:
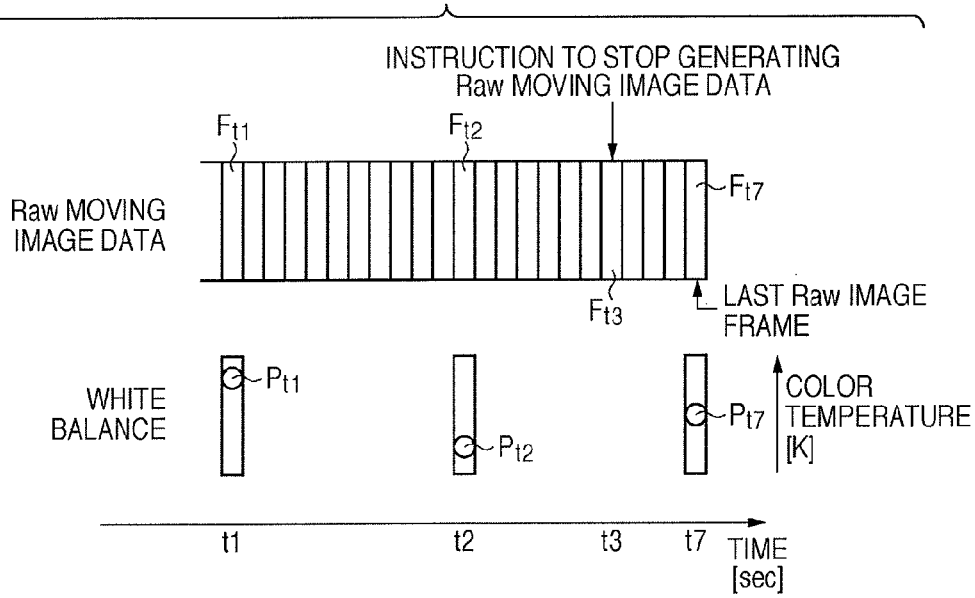

FIGS. 8A and 8B are views showing Raw moving image data (that is, the Raw moving image data generated by the operation shown in FIG. 7) in the image capturing apparatus 100 of this embodiment. Referring to FIGS. 8A and 8B, Raw image frames constituting Raw moving image data and development parameters (white balances in this embodiment) are arranged along the time axis.

FIG. 8A shows Raw moving image data to be recorded when the user has issued an instruction to stop generating Raw moving image data at time t3 and a Raw image frame $F_{t3}$ at time t3 satisfies a predetermined condition. Referring to FIG. 8A, a Raw image frame $F_{t1}$ at time t1 and a Raw image frame $F_{t2}$ at time t2 are determined as Raw image frames extracted at predetermined frame intervals, and white balances $P_{t1}$ and $P_{t2}$ corresponding to the respective frames are recorded. In addition, a Raw image frame $F_{t3}$ at time t3 which is generated when the user issued the instruction to stop generating Raw moving image data satisfies the predetermined condition, and is determined as a Raw image frame extracted at the predetermined frame intervals. Therefore, the apparatus sets the Raw image frame $F_{t3}$ as the last Raw image frame, and records a white balance $P_{t3}$ corresponding to the Raw image frame $F_{t3}$.

FIG. 8B shows Raw moving image data to be recorded when the user issues an instruction to stop generating Raw moving image data at time t3 and the Raw image frame $F_{t3}$ at time t3 does not satisfies the predetermined condition. Referring to FIG. 8B, the Raw image frame $F_{t1}$ at time t1 and the Raw image frame $F_{t2}$ at time t2 are determined as Raw image frames extracted at predetermined frame intervals, and the white balances $P_{t1}$ and $P_{t2}$ corresponding to the respective frames are recorded. Note, however, that since the Raw image frame $F_{t3}$ at time t3 when the user issued the instruction to stop generating Raw moving image data does not satisfy the predetermined condition, the frame is not determined as a Raw image frame extracted at the predetermined frame intervals. The apparatus therefore continues generating Raw moving image data until the generation of a Raw image frame satisfying the predetermined condition. A Raw image frame $F_{t7}$ generated at time t7 satisfies the predetermined condition, and hence is determined as a Raw image frame extracted at the predetermined frame intervals. As a result, the apparatus sets the Raw image frame $F_{t7}$ as the last Raw image frame, and records a white balance $P_{t7}$ corresponding to the Raw image frame $F_{t7}$.

As described above, in this embodiment, when the user issues an instruction to stop generating Raw moving image data, the apparatus continues generating Raw moving image data until the generation of a Raw image frame satisfying the predetermined condition (that is, shifts the timing of stopping capturing a moving image). This makes it possible to determine the Raw image frame satisfying the predetermined condition, which is generated last, as the last Raw image frame, and record a development parameter corresponding to the Raw image frame in association with the Raw moving image data. When reproducing such Raw moving image data, therefore, it is possible to generate proper development parameters for Raw image frames in which no development parameter has been recorded, by interpolation processing, and reproduce the Raw moving image data with desired image quality.

Fourth Embodiment

Figure 9:
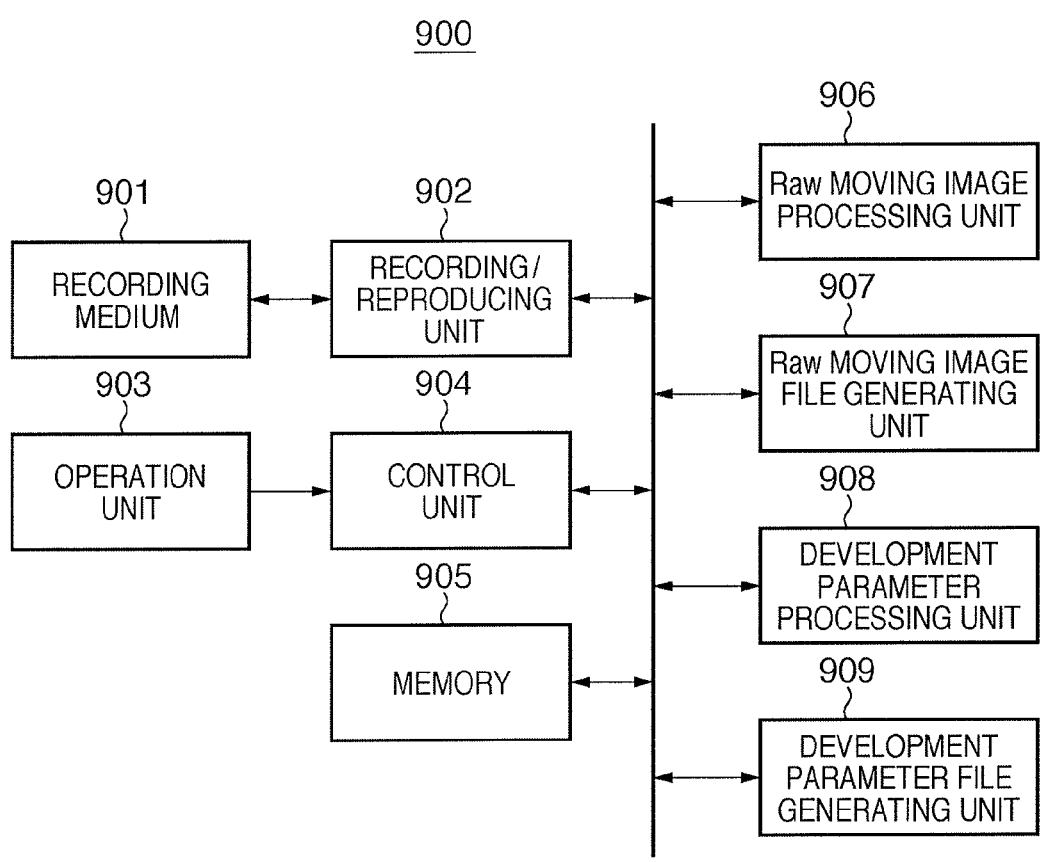
FIG. 9 is a schematic block diagram showing the arrangement of an image processing apparatus as one aspect of the present invention.

FIG. 9 is a schematic block diagram showing the arrangement of an image processing apparatus 900 as one aspect of the present invention. The image processing apparatus 900 divides Raw moving image data into a plurality of Raw moving image data (first and second Raw moving image data in this embodiment). Assume that Raw moving image data divided by the image processing apparatus 900 is recorded by, for example, an image capturing apparatus 100, and is constituted by a plurality of Raw image frames, and that development parameters are respectively associated with some Raw image frames.

The image processing apparatus 900 includes a recording medium 901, a recording/reproducing unit 902, an operation unit 903, a control unit 904, and a memory 905. In addition, the image processing apparatus 900 includes a Raw moving image processing unit 906, a Raw moving image file generating unit 907, a development parameter processing unit 908, and a development parameter file generating unit 909.

The recording medium 901 includes, for example, an optical recording medium or a semiconductor recording medium. Raw moving image data is recorded on the recording medium 901, on which a Raw moving image file and a development parameter file are recorded in this embodiment.

For example, the recording/reproducing unit 902 reads out image data recorded on the recording medium 901, and writes image data in the recording medium 901. In this embodiment, the recording/reproducing unit 902 has a function of reading out the Raw moving image data recorded on the recording medium 901 and development parameters corresponding to Raw image frames constituting the Raw moving image data from the recording medium 901. The recording/reproducing unit 902 also has a function of recording Raw moving image data and development parameters corresponding to Raw image frames constituting the Raw moving image data on the recording medium 901.

The operation unit 903 is constituted by various buttons for accepting user's operation (inputting an operation instruction) and the like. For example, the operation unit 903 includes a dividing start button and a dividing position button. The user can issue an instruction to start dividing Raw moving image data by operating the dividing start button. In addition, the user can designate a dividing position of Raw moving image data, that is, the last Raw image frame of the first Raw moving image data or the start Raw image frame of the second Raw moving image data, by operating the dividing position button.

The control unit 904 includes a CPU, and controls the overall operation of the image processing apparatus 900. When dividing, for example, Raw moving image data, the control unit 904 controls the respective units of the image processing apparatus 900 so as to record a development parameter corresponding to the last Raw image frame or start Raw image frame of Raw moving image data after dividing operation.

The memory 905 includes, for example, a semiconductor storage device such as an SDRAM, and temporarily stores Raw moving image data output from the Raw moving image processing unit 906 and development parameters output from the development parameter processing unit 908.

The Raw moving image processing unit 906 extracts Raw image data, for each frame, from the Raw moving image file read out by the recording/reproducing unit 902. The control unit 904 controls the Raw moving image processing unit 906 to separately output Raw images frames constituting the first Raw moving image data and Raw image frames constituting the second Raw moving image data.

The Raw moving image file generating unit 907 generates the first moving image file corresponding to the first Raw image data and the second moving image file corresponding to the second image data based on the Raw image data output from the Raw moving image processing unit 906. The first and second moving image files generated by the Raw moving image file generating unit 907 are recorded on the recording medium 901 via the recording/reproducing unit 902.

The development parameter processing unit 908 extracts development parameters, for each frame, from the development parameter file read out by the recording/reproducing unit 902. The control unit 904 controls the development parameter processing unit 908 to perform interpolation processing for the generation of development parameters. The development parameter processing unit 908 outputs the development parameters extracted from a development parameter file and the development parameters generated by interpolation processing.

The development parameter file generating unit 909 generates a development parameter file based on the development parameters output from the development parameter processing unit 908. The development parameter file generated by the development parameter file generating unit 909 is recorded on the recording medium 901 via the recording/reproducing unit 902.

The operation of the image processing apparatus 900, that is, the operation of dividing the Raw moving image data recorded on the recording medium 901 into the first and second Raw moving image data will be described with reference to FIG. 10. The control unit 904 executes this operation by comprehensively controlling the respective units of the image processing apparatus 900. Note that a frame number n is set to 1 (n=1) for the start Raw image frame corresponding to the leading image frame in Raw moving image data before dividing operation, and is set to N (n=N) for the last Raw image frame corresponding to the last image frame.

In step S1002, the control unit 904 detects that the user has issued an instruction to divide Raw moving image data (that is, has operated the dividing start button) via the operation unit 903. This causes the image processing apparatus 900 to start dividing Raw moving image data, and the recording/reproducing unit 902 reads out the Raw moving image data recorded on the recording medium 901.

In step S1004, the control unit 904 designates a dividing position of Raw moving image data, that is, the last Raw image frame of the first Raw moving image data or the start Raw image frame of the second Raw moving image data, in accordance with the operation of the dividing position button by the user. Assume that in this embodiment, the control unit 904 has designated the Raw image frame of the frame number M (1<M<N) as the start Raw image frame of the second Raw moving image data.

In step S1006, the Raw moving image file generating unit 907 generates the first and second Raw moving image files based on the dividing position designated in step S1004 under the control of the control unit 904. The first Raw moving image file corresponds to the first Raw moving image data, and is constituted by Raw image frames from the start Raw image frame to the Raw image frame of a frame number (M−1). The second Raw moving image file is constituted by Raw image frames from the Raw image frame of the frame number M to the last Raw image frame of the frame number N. Note that this embodiment will be described assuming that the first and second Raw moving image files are generated. However, it is possible to record only the information of a dividing position without generating a new Raw moving image file.

In step S1008, the control unit 904 initializes flags, variables, and the like associated with Raw moving image data dividing operation. More specifically, the control unit 904 initializes the frame number n in interpolation processing for development parameters. This embodiment will exemplify a case in which development parameters are generated by interpolation processing for the Raw image frame of the frame number (M−1) and the Raw image frame of the frame number M. First of all, therefore, the frame number n is set to M−1.

In step S1010, the control unit 904 determines whether there is a development parameter corresponding to the Raw image frame of the frame number n. If there is a development parameter corresponding to the Raw image frame of the frame number n, the process shifts to step S1018. If there is no development parameter corresponding to the Raw image frame of the frame number n, the process shifts to step S1012.

In step S1012, under the control of the control unit 904, the development parameter processing unit 908 acquires a development parameter for a Raw image frame, of the Raw image frames for which development parameters are recorded, which immediately precedes the Raw image frame of the frame number n.

In step S1014, under the control of the control unit 904, the development parameter processing unit 908 acquires a development parameter for a Raw image frame, of the Raw image frames for which development parameters are recorded, which immediately succeeds the Raw image frame of the frame number n.

In step S1016, under the control of the control unit 904, the development parameter processing unit 908 generates a development parameter corresponding to the Raw image frame of the frame number n by performing interpolation processing using the development parameters acquired in steps S1012 and S1014.

In step S1018, under the control of the control unit 904, the development parameter file generating unit 909 generates a development parameter file by recording (writing) the development parameter for the Raw image frame of the frame number n in a file. More specifically, if there is a development parameter for the Raw image frame of the frame number n, the development parameter is recorded. If there is no development parameter for the Raw image frame of the frame number n, the development parameter generated in step S1016 is recorded.

In step S1020, the control unit 904 determines whether the frame number n is M (n=M). If the frame number n is not M, the process shifts to step S1008, in which the control unit 904 increments the frame number n by 1. In this embodiment, if the frame number n is (M−1), the process shifts to step S1008 to set the frame number n to M−1+1=M (n=M) and execute the processing in steps S1010 to S1018. If the frame number n is M, the process shifts to step S1022.

In step S1022, under the control of the control unit 904, the recording/reproducing unit 902 records, on the recording medium 901, the first and second Raw image files generated in step S1006 and the development parameter file generated in step S1018. In other words, in step S1022, the Raw moving image data is divided into first and second Raw moving image data and recorded on the recording medium 901. In this case, in the first Raw moving image data, the Raw image frame of the frame number (M−1) (the last Raw image frame of the first Raw moving image data) and the development parameter corresponding to the Raw image frame are recorded in association with each other. In the second Raw moving image data, the Raw image frame of the frame number M (the start Raw image frame of the second Raw moving image data) and the development parameter corresponding to the Raw image frame are recorded in association with each other.

Figure 10:
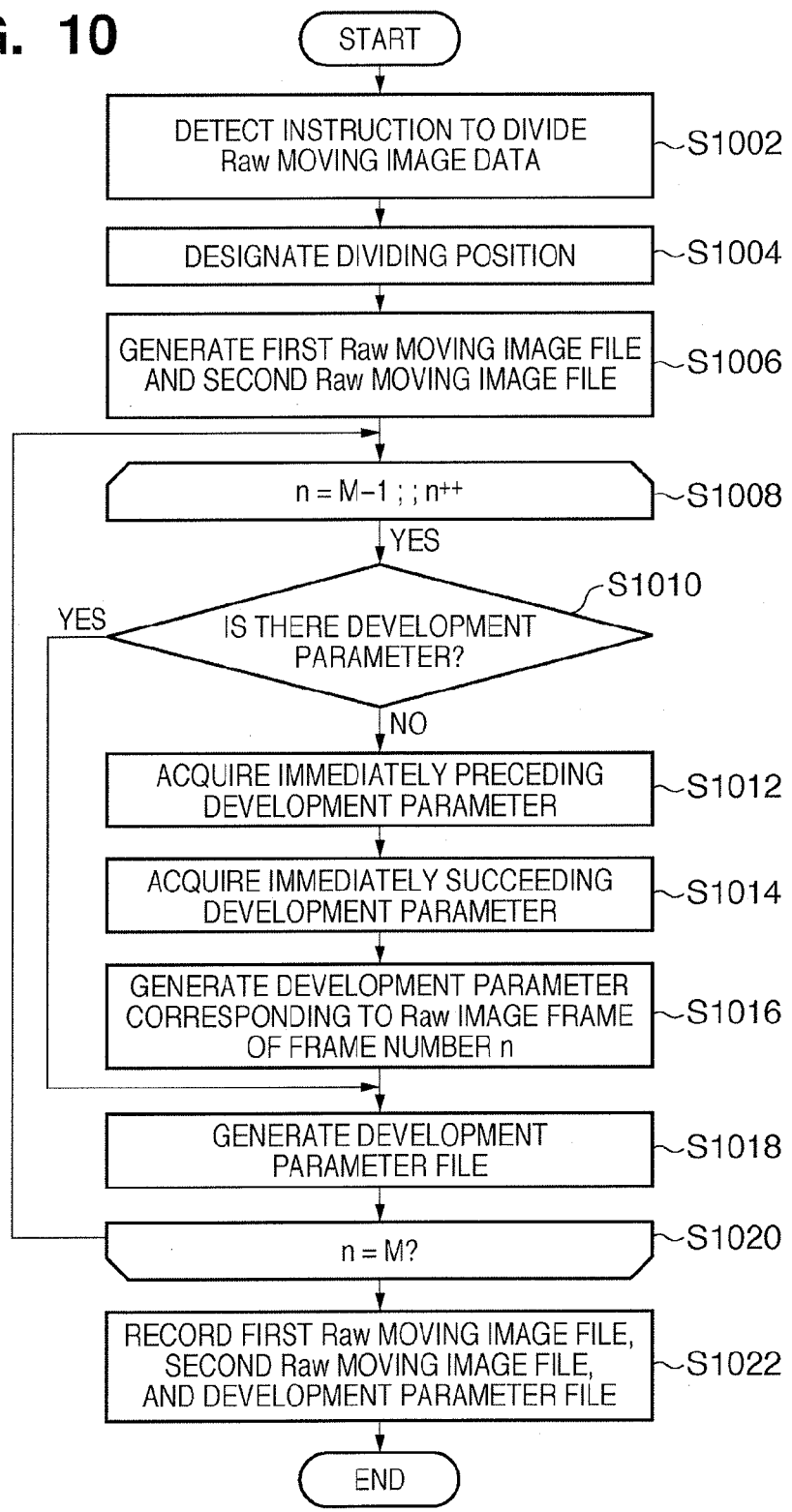
FIG. 10 is a flowchart for explaining the operation of the image processing apparatus shown in FIG. 9.
Figure 12:
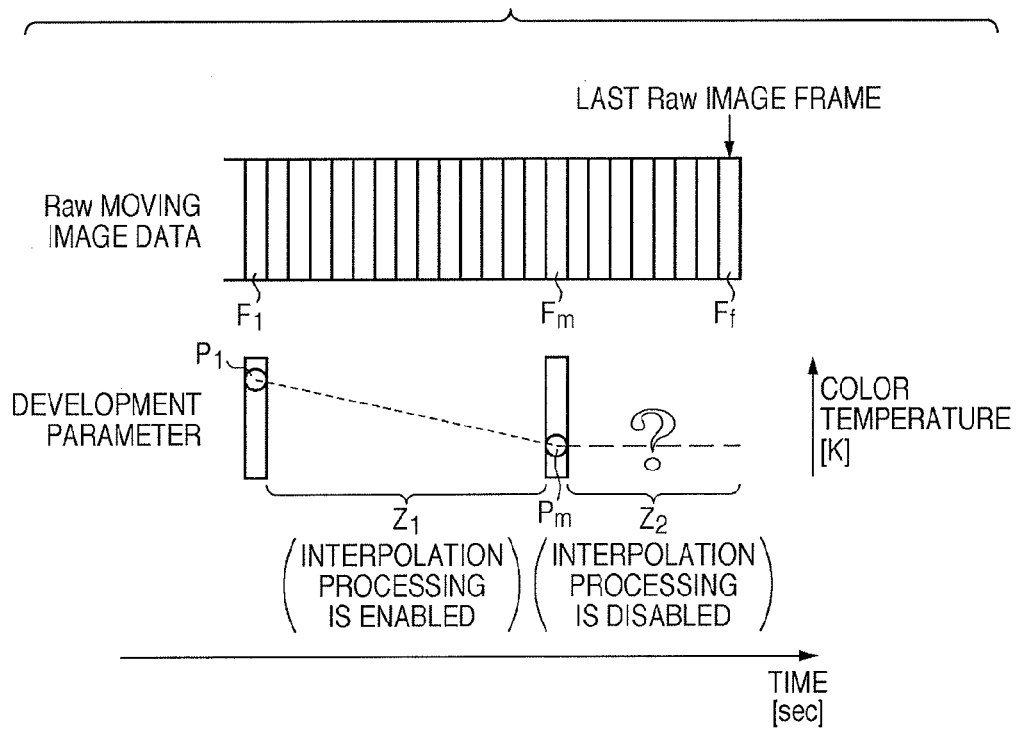
FIG. 12 is a view showing Raw moving image data recorded in the prior art.

FIGS. 11A and 11B are views showing Raw moving image data divided by the image processing apparatus 900 (that is, the first and second Raw moving image data generated by the operation shown in FIG. 10). Referring to FIGS. 11A and 11B, Raw image frames constituting Raw moving image data and development parameters (white balances in this embodiment) are arranged along the time axis.

FIG. 11A shows Raw moving image data to be divided by the image processing apparatus 900 (that is, Raw moving image data before dividing operation). Referring to FIG. 11A, in the Raw moving image data before dividing operation, white balances $P_2$ and $P_{N-2}$ respectively corresponding to a Raw image frame $F_2$ of frame number 2 and a Raw image frame $F_{N-2}$ of a frame number (N−2) are recorded.

FIG. 11B shows Raw moving image data divided by the image processing apparatus 900 (that is, the first and second Raw moving image data). Raw moving image data is divided into the first Raw moving image data constituted by Raw image frames $F_1$ to $F_{M-1}$ of frame numbers 1 to (M−1) and the second Raw moving image data constituted by Raw image frames $F_M$ to $F_N$ of frame numbers M to N. In this case, this apparatus generates a white balance $P_{M-1}$ corresponding to the Raw image frame $F_{M-1}$ as the last Raw image frame of the first Raw moving image data by interpolation processing using the white balances $P_2$ and $P_{N-2}$ for the Raw image frames $F_2$ and $F_{N-2}$. Likewise, the apparatus generates a white balance $P_M$ corresponding to the Raw image frame $F_M$ as the start Raw image frame of the second Raw moving image data by interpolation processing using the white balances $P_2$ and $P_{N-2}$ for the Raw image frames $F_2$ and $F_{N-2}$. In the first Raw moving image data, the white balance $P_{M-1}$ for the Raw image frame $F_{M-1}$ is recorded in addition to the white balance $P_2$ for the Raw image frame $F_2$. Likewise, in the second Raw moving image data, the white balance $P_M$ for the Raw image frame $F_M$ is recorded in addition to the white balance $P_{N-2}$ for the Raw image frame $F_{N-2}$.

In this manner, in this embodiment, when dividing Raw moving image data into a plurality of Raw moving image data, the apparatus generates a development parameter corresponding to the last Raw image frame or start Raw image frame of the Raw moving image data after dividing operation by interpolation processing. This makes it possible to record a development parameter corresponding to the last Raw image frame or start Raw image frame of Raw moving image data after dividing operation and the Raw moving image data after dividing operation in association with each other. Therefore, when reproducing the Raw moving image data after dividing operation, the apparatus can generate a proper development parameter for a Raw image frame in which no development parameter has been recorded, by interpolation processing, and reproduce Raw moving image data with desired image quality.

As has been described above, according to the present invention, it is possible to record a development parameter corresponding to the last Raw image frame of Raw moving image data in association with the Raw moving image data. Therefore, when reproducing (developing) Raw moving image data, the apparatus can generate a proper development parameter for a Raw image frame near the last Raw image frame by interpolation processing. This makes it possible to reproduce Raw moving image data with desired image quality as compared with the prior art which is not controlled to record a development parameter corresponding to the last Raw image frame of Raw moving image data.

Note that in this embodiment, development parameters are recorded as a development parameter file separately from Raw moving image data (Raw moving image file). However, it is possible to record development parameters in the same file as that of Raw moving image data. In addition, when recording development parameters, the apparatus can also record the frame numbers, time information indicating imaging times, and the like of corresponding Raw image frames.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-100361 filed on Apr. 23, 2010, which is hereby incorporated by reference herein in its entirety.

What is claimed is:

1. An image capturing apparatus for controlling the record of Raw moving image data including a plurality of Raw image frames, the apparatus comprising:
   a processor;
   and a memory storing a program which, when executed by the processor, causes the image capturing apparatus to function as a device that comprises:
   generating a development parameter corresponding to each of a plurality of first Raw image frames, which satisfy a predetermined condition, included in the Raw moving image data;
   and recoding, on a recording medium, the Raw moving image data and the development parameter generated for each of the plurality of the first Raw image frames,
   wherein the plurality of first Raw image frames which satisfy the predetermined condition are Raw image frames extracted from the plurality of Raw image frames at a predetermined frame interval or Raw image frames corresponding to a scene change,
   and when a user issues an instruction to stop generating the Raw moving image,
   generate a development parameter corresponding to a last Raw image frame, which does not satisfy the predetermined condition,
   and record, on the recording medium, the development parameter corresponding to the last Raw image frame together with the Raw moving image data.

2. The apparatus according to claim 1, wherein when the user issues the instruction to stop generating the Raw moving image,
   generate a development parameter corresponding to a second Raw image frame, which is one frame prior to the last Raw image frame and does not satisfy the predetermined condition,
   and record, on the recording medium, the development parameter corresponding to the second Raw image frame together with the Raw moving image data.

3. The apparatus according to claim 1, wherein the development parameters include at least one of parameters related to contrast, exposure correction, white balance, hue, color space, tone curve, and contour enhancement.

4. An image capturing apparatus for controlling the record of Raw moving image data including a plurality of Raw image frames, the apparatus comprising:
   a processor;
   and a memory storing a program which, when executed by the processor, causes the image capturing apparatus to function as a device that comprises:
   generating a plurality of development parameters respectively corresponding to a plurality of Raw moving image frames;

deleting development parameters except for development parameters corresponding to a plurality of first Raw image frames, which satisfy a predetermined condition, included in the Raw moving image data;

and recording, on a recording medium, the Raw moving image data and the development parameters which was not deleted, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image, not to delete a development parameter corresponding to a last Raw image frame, which does not satisfy the predetermined condition.

5. A method of controlling an image capturing apparatus which records Raw moving image data including a plurality of Raw image frames, the method comprising the steps of:

generating a development parameter corresponding to each of a plurality of first Raw image frames, which satisfy a predetermined condition, included in the Raw moving image data; and recording, on a recording medium, the Raw moving image data and the development parameter generated in the step of generating for each of the plurality of the first Raw image frames, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image, the step of generating is configured to generate a development parameter corresponding to a last Raw image frame, which does not satisfy the predetermined condition, and the step of recording is configured to record, on the recording medium, the development parameter corresponding to the last Raw image frame together with the Raw moving image data.

6. The method according to claim 5, wherein when the user issues the instruction to stop generating the Raw moving image, the step of generating is configured to generate a development parameter corresponding to a second Raw image frame, which is one frame prior to the last Raw image frame and does not satisfy the predetermined condition, and the step of recording is configured to record, on the recording medium, the development parameter corresponding to the second Raw image frame together with the Raw moving image data.

7. The method according to claim 5, wherein the development parameters includes at least one of parameters related to contrast, exposure correction, white balance, hue, color space, tone curve, and contour enhancement.

8. A method of controlling an image capturing apparatus which controls the record of Raw moving image data including a plurality of Raw image frames, the method comprising the steps of:

generating a plurality of development parameters respectively corresponding to the plurality of Raw moving image frames;

deleting development parameters except for development parameters corresponding to a plurality of first Raw image frames, which satisfy a predetermined condition, included in the Raw moving image data; and recording, on a recording medium, the Raw moving image data and the development parameters which was not deleted by the step of deleting, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image, the step of deleting is configured not to delete a development parameter corresponding to a last Raw image frame, which does not satisfy the predetermined condition.

9. A non-transitory computer-readable storage medium storing a computer-executable program for implementing a method of controlling an image capturing apparatus which records Raw moving image data including a plurality of Raw image frames, the method comprising the steps of:

generating a development parameter corresponding to each of a plurality of first Raw image frames, which satisfy a predetermined condition, included in the Raw moving image data; and recording, on a recording medium, the Raw moving image data and the development parameter generated in the step of generating for each of the plurality of the first Raw image frames, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image, the step of generating is configured to generate a development parameter corresponding to a last Raw image frame, which does not satisfy the predetermined condition, and the step of recording is configured to record, on the recording medium, the development parameter corresponding to the last Raw image frame together with the Raw moving image data.

10. An image capturing apparatus for recording Raw moving image data including a plurality of Raw image frames, the apparatus comprising:

a generating means for generating a development parameter corresponding to each of a plurality of first Raw image frames, which satisfy a predetermined condition, included in the Raw moving image data; and a recording means for recording, on a recording medium, the Raw moving image data and the development parameter generated by said generating means for each of the plurality of the first Raw image frames, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image while the imaging means is generating the Raw moving image data, the imaging means is configured to stop generating the Raw moving image data and to set a Raw image frame generated last as the last Raw image frame, the generating means is configured to generate a development parameter corresponding to the last Raw image frame, which does not satisfy the predetermined condition, and the recording means is configured to record, on the recording medium, the development parameter corresponding to the last Raw image frame together with the Raw moving image data.

11. The apparatus according to claim 10, wherein when the user issues the instruction to stop generating the Raw moving image, the generating means is configured to generate a development parameter corresponding to a second Raw image frame, which is one frame prior to the last Raw image frame and does not satisfy the predetermined condition, and the recording means is configured to record, on the recording medium, the development parameter corresponding to the second Raw image frame together with the Raw moving image data.

12. The apparatus according to claim 10, wherein the development parameters include at least one of parameters related to contrast, exposure correction, white balance, hue, color space, tone curve, and contour enhancement.

13. An image capturing apparatus for controlling the record of Raw moving image date including a plurality of Raw image frames, the apparatus comprising:

a generating means for generating a plurality of development parameters respectively corresponding to the plurality of Raw image frames;

a deleting means for deleting development parameters expect for development parameters corresponding to a plurality of first Raw image frames, which satisfy a predetermined condition, included in the Raw moving image date; and a recording means for recording, on a recording medium, the Raw moving image data and the development parameters which was not deleted by the deleting means, wherein the plurality of first Raw image frames which satisfy the predetermined condition are Raw image frames extracted from the plurality of Raw image frames at a predetermined frame interval or Raw image frames corresponding to a scene change, and when a user issues an instruction to stop generating the Raw moving image, the deleting means is configured not to delete a development parameter corresponding to a last Raw image frame, which does not satisfy the predetermined condition.

14. The apparatus according to claim 1, wherein the Raw moving image data is recorded into a Raw moving image file, and to record the development parameter corresponding to each of the plurality of the first Raw image frames and the development parameter corresponding to the last Raw image frame into a development parameter file.

15. The apparatus according to claim 1, wherein a development parameter corresponding to a Raw image frame between two of the first Raw image frames is generated by performing interpolation processing using development parameters associated with the two of the first Raw image frames.

16. The apparatus according to claim 4, wherein the development parameters include at least one of parameters related to contrast, exposure correction, white balance, hue, color space, tone curve, and contour enhancement.

17. The apparatus according to claim 4, wherein the Raw moving image data is recorded into a Raw moving image file, and to record the development parameter which was not deleted into a development parameter file.

18. The apparatus according to claim 4, wherein a development parameter corresponding to a Raw image frame between two of the first Raw image frames is generated by performing interpolation processing using development parameters associated with the two of the first Raw image frames.

19. The method according to claim 5, wherein the step of recording is configured to record the Raw moving image data into a Raw moving image file, and to record the development parameter corresponding to each of the plurality of the first Raw image frames and the development parameter corresponding to the last Raw image frame into a development parameter file.

20. The method according to claim 5, wherein a development parameter corresponding to a Raw image frame between two of the first Raw image frames is generated by performing interpolation processing using development parameters associated with the two of the first Raw image frames.

21. The method according to claim 8, wherein the development parameters include at least one of parameters related to contrast, exposure correction, white balance, hue, color space, tone curve, and contour enhancement.

22. The method according to claim 8, wherein the step of recording is configured to record the Raw moving image data into a Raw moving image file, and to record the development parameter which was not deleted by the step of deleting into a development parameter file.

23. The method according to claim 8, wherein a development parameter corresponding to a Raw image frame between two of the first Raw image frames is generated by performing interpolation processing using development parameters associated with the two of the first Raw image frames.

24. The apparatus according to claim 10, wherein the recording means is configured to record the Raw moving image data into a Raw moving image file, and to record the development parameter corresponding to each of the plurality of the first Raw image frames and the development parameter corresponding to the last Raw image frame into a development parameter file.

25. The apparatus according to claim 10, wherein a development parameter corresponding to a Raw image frame between two of the first Raw image frames is generated by performing interpolation processing using development parameters associated with the two of the first Raw image frames.

26. The apparatus according to claim 13, wherein the development parameters include at least one of parameters related to contrast, exposure correction, white balance, hue, color space, tone curve, and contour enhancement.

27. The apparatus according to claim 13, wherein the recording means is configured to record the Raw moving image data into a Raw moving image file, and to record the development parameter which was not deleted by the deleting means into a development parameter file.

28. The apparatus according to claim 13, wherein a development parameter corresponding to a Raw image frame between two of the first Raw image frames is generated by performing interpolation processing using development parameters associated with the two of the first Raw image frames.

* * * * *